US011252593B2

(12) United States Patent
Jung et al.

(10) Patent No.: US 11,252,593 B2
(45) Date of Patent: Feb. 15, 2022

(54) MOBILE COMMUNICATION METHOD AND DEVICE FOR BROADBAND SYSTEM

(71) Applicant: Samsung Electronics Co., Ltd., Gyeonggi-do (KR)

(72) Inventors: Euichang Jung, Seoul (KR); Jaeyun Ko, Gyeonggi-do (KR); Suyoung Park, Gyeonggi-do (KR); Suha Yoon, Gyeonggi-do (KR); Sunghyuk Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 38 days.

(21) Appl. No.: 16/646,399

(22) PCT Filed: Sep. 10, 2018

(86) PCT No.: PCT/KR2018/010556
§ 371 (c)(1),
(2) Date: Mar. 11, 2020

(87) PCT Pub. No.: WO2019/054709
PCT Pub. Date: Mar. 21, 2019

(65) Prior Publication Data
US 2020/0275297 A1    Aug. 27, 2020

(30) Foreign Application Priority Data

Sep. 15, 2017  (KR) .................. 10-2017-0118535

(51) Int. Cl.
*H04W 24/10*    (2009.01)
*H04B 7/06*     (2006.01)
(Continued)

(52) U.S. Cl.
CPC .......... *H04W 24/10* (2013.01); *H04B 7/0626* (2013.01); *H04L 5/0048* (2013.01);
(Continued)

(58) Field of Classification Search
None
See application file for complete search history.

(56) References Cited

U.S. PATENT DOCUMENTS 8,923,331 B2    12/2014  Han et al.
9,420,487 B2     8/2016  Jung et al.
(Continued)

FOREIGN PATENT DOCUMENTS

| KR | 10-2015-0010612 | 1/2015 |
| KR | 10-2015-0076319 | 7/2015 |
| WO | WO 2013-191636 | 12/2013 |

OTHER PUBLICATIONS

PCT/ISA/237 Search Report issued on PCT/KR2018/010556, pp. 6.
(Continued)

*Primary Examiner* — Scott M Sciacca
(74) *Attorney, Agent, or Firm* — The Farrell Law Firm, P.C.

(57) ABSTRACT

Disclosed are a communication technique for merging, with IoT technology, a 5G communication system for supporting a data transmission rate higher than that of a 4G communication system, and a system therefor. The present disclosure can be applied to intelligent services (for example, smart home, smart building, smart city, smart car or connected car, healthcare, digital education, retail, security and safety-related services, and the like) on the basis of 5G communication technology and IoT-related technology. The present disclosure can be applied to: an operating method of a base station, including the steps of transmitting a synchronization signal (SS) measurement report request to a terminal, receiving, from the terminal, a first measurement report including SS measurement information on a neighboring base station, transmitting to the terminal, a channel state information-reference signal (CSI-RS) measurement report request on the basis of the first measurement report, and receiving, from
(Continued)

the terminal, a second measurement report including the CSI-RS measurement information on the neighboring base station, the base station; a terminal communicating with the base station; and an operating method of the terminal.

11 Claims, 12 Drawing Sheets

(51) Int. Cl.
  *H04W 56/00* (2009.01)
  *H04L 5/00* (2006.01)
  *H04W 36/00* (2009.01)

(52) U.S. Cl.
  CPC . *H04W 36/0088* (2013.01); *H04W 36/00837* (2018.08); *H04W 56/001* (2013.01)

(56) References Cited

U.S. PATENT DOCUMENTS 9,462,562 B2  10/2016  Chakraborty et al.
2015/0023191 A1  1/2015  Kim et al.
2015/0195731 A1  7/2015  Jung et al.
2015/0208263 A1  7/2015  Behravan et al.
2020/0022040 A1*  1/2020  Chen ................... H04W 56/001
2020/0178194 A1*  6/2020  Li ......................... H04W 24/10

OTHER PUBLICATIONS

PCT/ISA/210 Written Opinion issued on PCT/KR2018/010556, pp. 5.
LG Electronics, "Further Remaining Details on Wider Bandwidth Operation", R1-1713204, 3GPP TSG RAN WG1 Meeting #90, Aug. 21-25, 2017, 7 pages.
Intel Corporation, "RRM Measurements for NR", R1-1716282, 3GPP TSG RAN WG1 Meeting NR Ad-hoc #3, Sep. 18-21, 2017, 13 pages.
Nokia, Alcatel-Lucent Shanghai Bell, "Intra/Inter-Frequency Definitions and Measurement Gaps", R2-1708471,3GPP TSG-RAN WG2 NR Adhoc #2, Jun. 27-29, 2017, 7 pages.
Korean Office Action dated May 7, 2021 issued in counterpart application No. 10-2017-0118535, 13 pages.

\* cited by examiner

FIG. 2
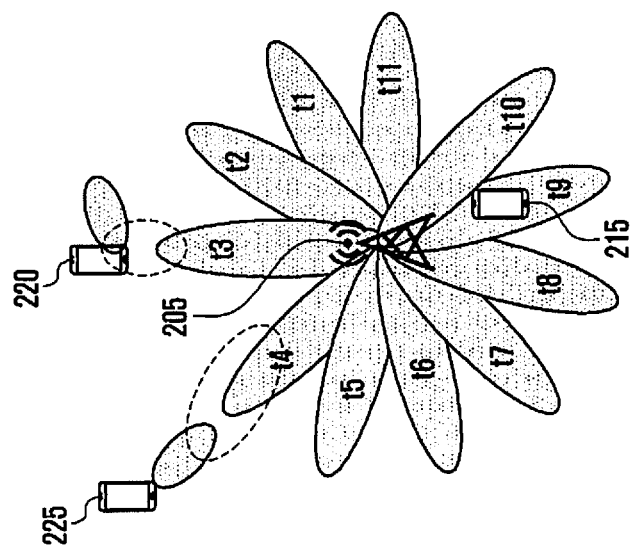
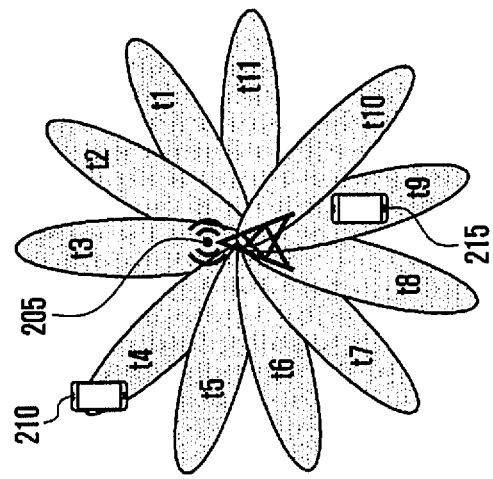

MOBILE COMMUNICATION METHOD AND DEVICE FOR BROADBAND SYSTEM

PRIORITY

This application is a National Phase Entry of PCT International Application No. PCT/KR2018/010556 which was filed on Sep. 10, 2018, and claims priority to Korean Patent Application No. 10-2017-0118535, which was filed on Sep. 15, 2017, the content of each of which is incorporated herein by reference.

TECHNICAL FIELD

The disclosure relates to a mobile communication method and apparatus for broadband system.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, technologies such as a sensor network, Machine to Machine (M2M), and Machine Type Communication (MTC) are implemented by beamforming, MIMO, and array antenna schemes. The application of a cloud RAN as the big data processing technology may be an example of convergence of the 5G technology and the IoT technology.

DISCLOSURE OF INVENTION

Technical Problem

An aspect of embodiments of the disclosure is to provide a mobile communication method and apparatus for a broadband system.

Another aspect of embodiments of the disclosure is to provide a new radio resource management (RRM) method in a broadband system and an apparatus for performing the same.

Solution to Problem

In accordance with an aspect of the disclosure, a method of operating a base station is provided. The method includes: transmitting a synchronization signal (SS) measurement report request to a terminal; receiving a first measurement report including SS measurement information for a neighbor base station from the terminal; transmitting a channel state information-reference signal (CSI-RS) measurement report request to the terminal, based on the first measurement report; and receiving a second measurement report including CSI-RS measurement information for the neighbor base station from the terminal.

In accordance with another aspect of the disclosure, a base station is provided. The base station includes: a transceiver configured to transmit and receive a signal; and a controller configured to perform control to transmit a synchronization signal (SS) measurement report request to a terminal, receive a first measurement report including SS measurement information for a neighbor base station from the terminal, transmit a channel state information-reference signal (CSI-RS) measurement report request to the terminal, based on the first measurement report, and receive a second measurement report including CSI-RS measurement information for the neighbor base station from the terminal.

In accordance with another aspect of the disclosure, a method of operating a terminal is provided. The method includes: receiving a synchronization signal (SS) measurement report request from a base station; transmitting a first measurement report including SS measurement information for a neighbor base station to the base station; receiving a channel state information-reference signal (CSI-RS) measurement report request from the base station in response to the first measurement report; and transmitting a second measurement report including CSI-RS measurement information for the neighbor base station to the base station.

In accordance with another aspect of the disclosure, a terminal is provided. The terminal includes: a transceiver configured to transmit and receive a signal; and a controller configured to perform control to receive a synchronization signal (SS) measurement report request from a base station, transmit a first measurement report including SS measurement information for a neighbor base station to the base station, receive a channel state information-reference signal (CSI-RS) measurement report request from the base station in response to the first measurement report, and transmit a second measurement report including CSI-RS measurement information for the neighbor base station to the base station.

The technical subjects pursued in the disclosure may not be limited to the above mentioned technical subjects, and other technical subjects which are not mentioned may be clearly understood, through the following descriptions, by those skilled in the art of the disclosure.

Advantageous Effects of Invention

According to embodiments of the disclosure, it is possible to provide a new radio resource management (RRM) method in a broadband system and an apparatus for performing the same.

BRIEF DESCRIPTION OF DRAWINGS

FIG. 2 illustrates beam sweeping according to an embodiment of the disclosure;

MODE FOR THE INVENTION

Figure 1:
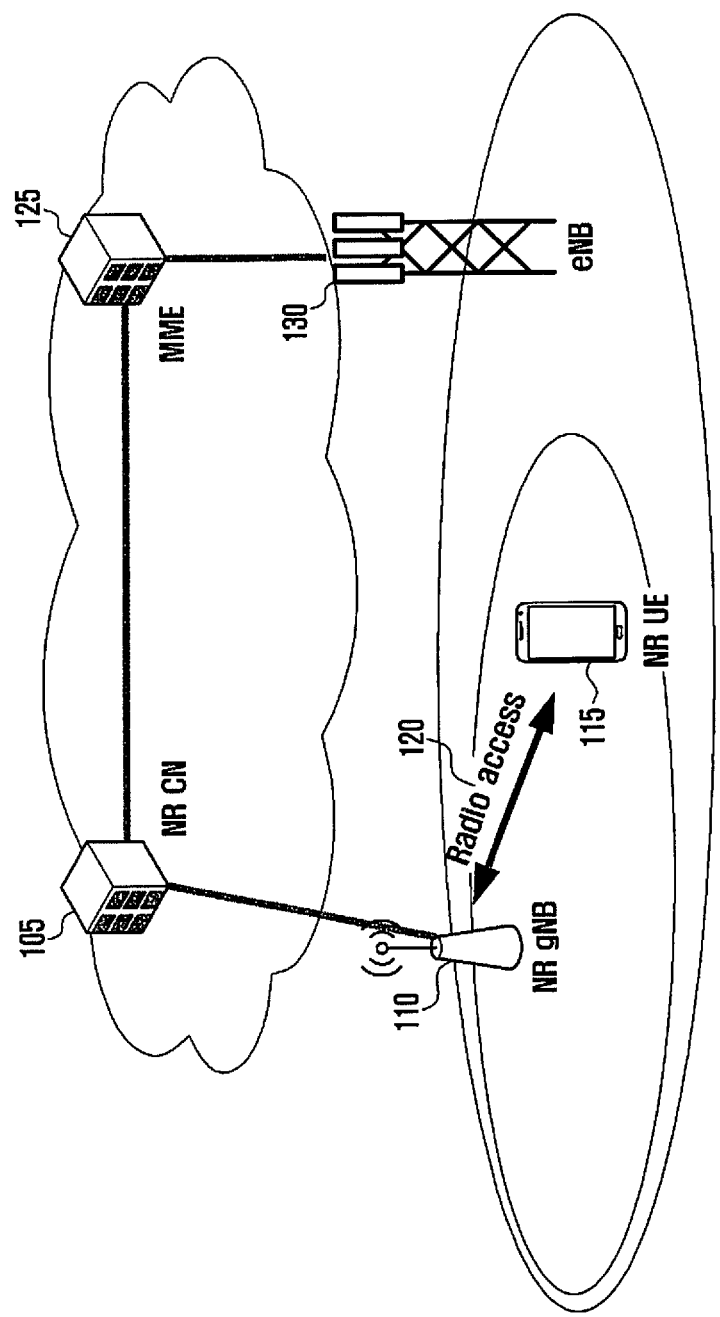
FIG. 1 illustrates a structure of a next-generation mobile communication system to which the disclosure can be applied.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In a description of embodiments of the disclosure, a description of technologies that are already known to those skilled in the art and are not directly relevant to the disclosure is omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

In embodiments of the disclosure, a base station and a cell may be used to correspond to each other. A serving base station may correspond to a serving cell, and a neighbor base station may correspond to a neighbor cell. Accordingly, operation of the serving base station may be understood as operation of the serving cell, and operation of the neighbor base station may be understood as operation of the neighbor cell.

FIG. 1 illustrates a structure of a next-generation mobile communication system to which the disclosure can be applied.

Referring to FIG. 1, as illustrated in FIG. 1, a radio access network of the next-generation mobile communication system includes a next-generation base station (hereinafter, referred to as a new radio node B (NR NB) or gNB) and a new radio core network (NR CN) 105. A user terminal 115 (hereinafter, referred to as a new radio user equipment (NR UE) or a UE) accesses an external network through the NR NB 110 and the NR CN 105.

In FIG. 1, the NR NB 110 corresponds to an evolved Node B (eNB) in a conventional LTE system. The NR NB may be connected to the NR UE 115 through a radio channel and may provide better service than the conventional node B. Since all user traffic is serviced through a shared channel in the next-generation mobile communication system, a device for collecting and scheduling status information of buffer statuses, available transmission power statuses, and channel statuses of UEs is required, which corresponds to the NR NB 110. One NR NB generally controls a plurality of cells. The NR NB may have a bandwidth wider than the conventional maximum bandwidth in order to implement super-high-speed data transmission compared to conventional LTE and may apply orthogonal frequency division multiplexing (OFDM) through radio access technology and further apply beamforming technology. Further, an adaptive modulation and coding (AMC) scheme of determining a modulation scheme and a channel coding rate is applied depending on the channel status of the UE. The NR CN 105 performs a function of supporting mobility, configuring a bearer, and configuring QoS. The NR CN is a device for performing a function of managing the mobility of the UE and various control functions, and is connected to a plurality of base stations. Further, the next-generation mobile communication system may be linked to the conventional LTE system, and the NR CN is connected to an MME 125 through a network interface. The MME is connected to an eNB 130, which is a conventional base station.

FIG. 2 illustrates beam sweeping according to an embodiment of the disclosure.

Referring to FIG. 2, NR aims to support a data transmission rate higher than conventional LTE. In NR, as a method of increasing a data transmission rate, a method of transmitting a signal through a wider frequency band higher than or equal to a frequency band of 6 Hz is being considered. That is, it is being considered to increase a transmission rate through a millimeter wave (hereinafter, referred to as mmWave) band such as a band of 28 GHz or 60 GHz. Since a frequency band considered for the mmWave has a relatively large signal attenuation size per distance, transmission of directional beams generated using multiple antennas is required to secure coverage. Transmission based on directional beams has difficulty in transmitting or receiving a signal at a location at which no beam is formed and uses a beam sweeping scheme in order to resolve the difficulty. Beam sweeping is a scheme in which a transmission device transmits directional beams having a predetermined beam width while sequentially sweeping or rotating the directional beams and thus reception beams within a beam arrival distance of the transmission device receive the beams. For example, a transmission reception point (TRP) 205 (corresponding to a device for transmitting and receiving a wireless signal to a network, for example, a 5G NB or a device connected to a 5G NB) transmits directional beams having a predetermined width in a predetermined direction at a time point t1 and transmits directional beams having the same width in a different direction at a time point t2 so as to allow the beams to cover all directions for a predetermined period. As a result, a downlink signal transmitted by the base station reaches a terminal 215 at t9 and reaches a terminal 210 at t4.

The beam sweeping is mainly used when the base station does not know the direction of a directional beam to be applied to the terminal, and a common overhead signal to be transmitted to an idle-state terminal is transmitted through the beam sweeping.

In order to increase efficiency of the beam, not only a transmission directional beam but also reception directional beam may be used. If the reception directional beam is used, directivity/direction of the transmission beam should correspond to directivity/direction of the reception beam. For example, in case that directivity of the reception beam does not correspond to directivity of the transmission beam even though the terminal is located in an area of the transmission beam as indicated by reference numeral 220, the terminal cannot receive the transmission beam. On the other hand, in case that directivity of the transmission beam corresponds to directivity of the reception beam as indicated by reference numeral 225, data can be transmitted and received with significantly high efficiency compared to the case in which the reception beam is not used.

In order to find a reception beam corresponding to the transmission beam, the reception device searches for a reception beam for providing the best reception quality by applying different reception beams to the same transmission beam. Such a process is referred to as reception beam sweeping.

In a mobile communication system using a directional beam, an analog beam, or a hybrid beam, the common overhead signal is transmitted in a specific subframe through beam sweeping, but user data can be transmitted and received to and from a specific terminal through a directional beam of a single direction in another subframe.

Figure 3:
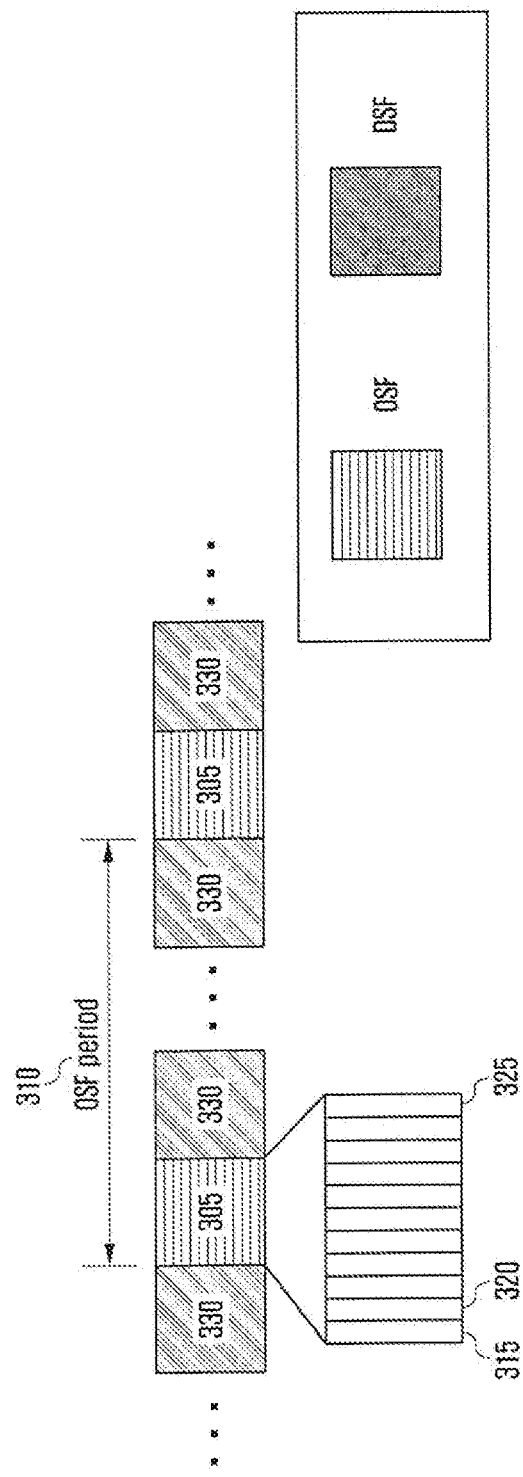
FIG. 3 illustrates a subframe structure in a next-generation mobile communication system to which the disclosure can be applied.

FIG. 3 illustrates the subframe structure in a next-generation mobile communication system to which the disclosure can be applied.

A subframe 305 (hereinafter, referred to as an overhead subframe (OSF)) including the overhead signal is repeatedly transmitted according to a predetermined period 310. One subframe consists of a plurality of symbols, and one directional beam may be transmitted per symbol in the OSF. For example, in the OSF, a first symbol 315 may correspond to t1, a second symbol 320 may correspond to t2, and an eleventh symbol 325 may correspond to t11. Each symbol has the same beam width but covers a different area, and a directional beam (or an analog beam) having directivity configured in a different direction may be transmitted therethrough.

The following overhead signals may be transmitted in respective symbols of the OSF.

Signals for establishing downlink synchronization such as a primary synchronization signal (PSS), a secondary synchronization signal (SSS), and the like Beam reference signal (BRS) of which received signal strength or received signal quality can be measured for each beam System information, a master information block (MIB), or a physical broadcast channel (PBCH)

PBCH includes information required when the terminal accesses a system, for example, a downlink beam bandwidth and a system frame number For reference, a PLMN identifier may be broadcasted through another channel rather than MIB.

The same beam is transmitted over a plurality of successive symbols in a subframe which is not a periodically transmitted OSF, and user data for a specific connected-state terminal may be transmitted through the beam. Hereinafter, the subframe is referred to as a data subframe (DSF) 330.

In LTE and LTE-A, intra-frequency neighbor (cell) measurements and inter-frequency neighbor (cell) measurements are supported. Intra-frequency neighbor (cell) measurements support mobility between the same frequencies in a system having a frequency reuse factor of 1. Inter-frequency neighbor (cell) measurements support mobility between different carrier frequencies. Further, in LTE and LTE-A systems, inter-RAT frequency neighbor (cell) measurements are supported.

In LTE, a neighbor cell bandwidth (BW) and a serving cell bandwidth may be the same in the form of a system bandwidth in an embodiment. In another embodiment, as enhanced machine type communication (eMTC) is introduced, the terminal may support a narrow band (narrow BW). In another embodiment, in LTE, a neighbor cell BW and a serving cell BS may be different from each other. In this case, the terminal may identify a system BW of the neighbor cell on the basis of PBCH information. The terminal is designed to support the system BW in a viewpoint of capability. In LTE, the terminal performs radio resource management (RRM) measurement and reporting using CRSs regularly distributed in the system BS of each cell.

Like LTE, there is no cell-specific reference signal (CRS) covering the entire band in the 5G NR system, and a configurable Channel state information-reference signal (CSI-RS) which replaces the CRS has been proposed. Compared to LTE, terminal capability in NR may be more various, and an RRM (L3 mobility) measurement method is necessary due to design of the NR system supporting a broadband (wider bandwidth, for example, 400 MHz to 1 GHz) which cannot be used in LTE. Further, a wider BW is supported in NR, but a method of performing RRM by applying the concept of a UE BW part that does not exist in LTE is needed in a condition in which an RX BW of the terminal is limited. Embodiments of the disclosure provide an RRM method using a CSI-RS, a configuration and acquisition of CSI-RS information of a neighbor cell for RRM, and the form of a CSI-RS in such a situation.

Figure 4:
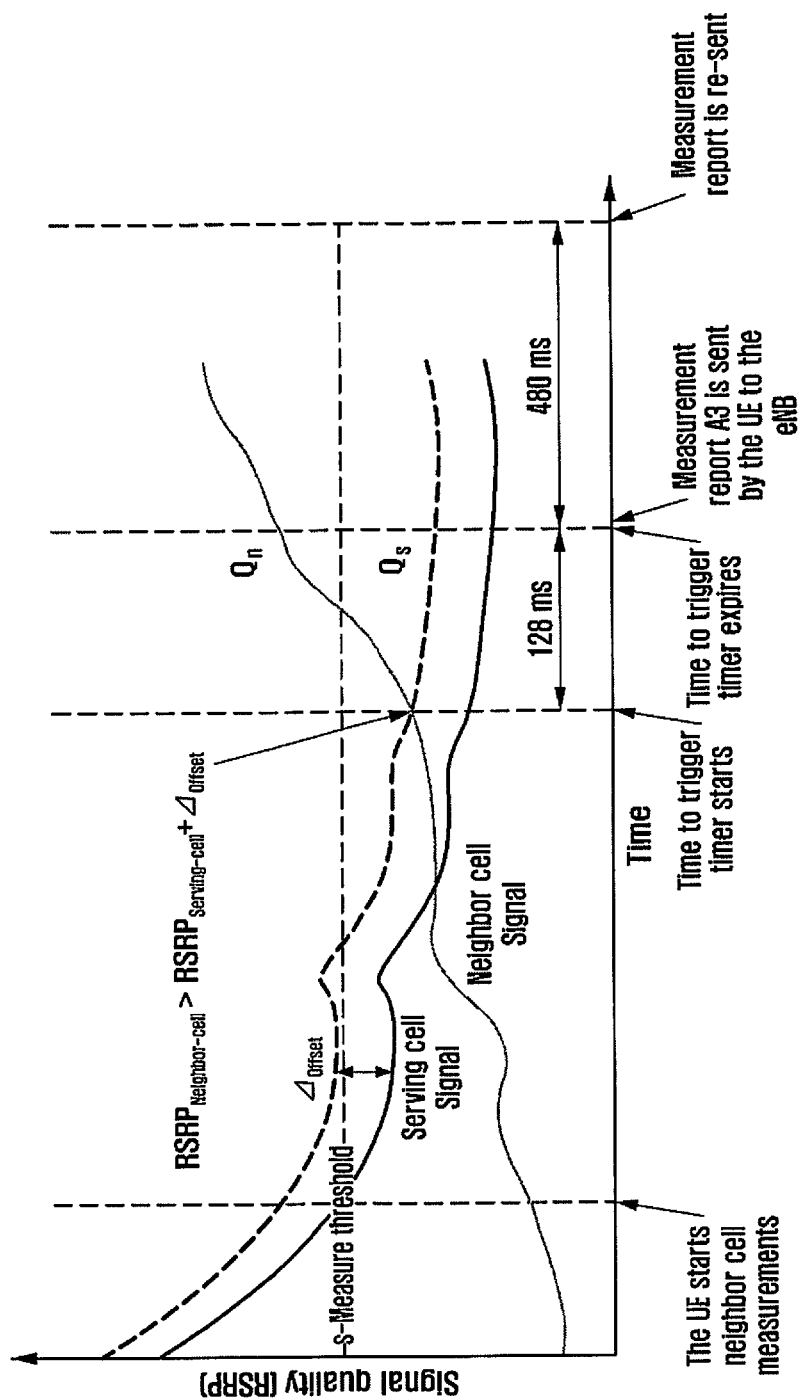
FIG. 4 illustrates a measurement report and a handover condition.

FIG. 4 illustrates a measurement report and a handover condition.

In LTE, various event conditions may be configured for a measurement report. For example, the event conditions may be described below.

Event A1: serving cell (TRP) becomes better than absolute threshold

Event A2: serving cell becomes worse than absolute threshold

Event A3: neighbor cell becomes better than an offset relative to serving cell

Event A4: neighbor cell becomes better than absolute threshold

Event A5: serving cell becomes worse than one absolute threshold and neighbor cell becomes better than another absolute threshold Event A6: neighbor cell becomes better than an offset relative to the secondary cell (Scell)

Event types are not limited to the above-listed events. Events A1 to A6 may be used for intra-LTE mobility. The base station may configure or instruct the terminal to measure/monitor channel states of the serving cell and the neighbor cell for intra-LTE mobility.

Although not mentioned above, additional events may be configured for other purposes. For example, Events B1 and B2 may be used for inter-RAT mobility. Meanwhile, in this case, a separate measurement gap is not required in LTE.

The terminal receiving a configuration of the event related to the measurement report from the base station may measure the serving cell and/or the neighbor cell in accordance with the measurement report, and may report the measurement result only when the measurement result satisfies an event trigger condition.

FIG. 4 shows a process in which the terminal in which Event A3 is configured measures the serving cell and the neighbor cell and, in case that the measurement result satisfies the event condition, reports the measurement result.

The terminal in which Event A3 is configured measures the serving cell and the neighbor cell. The terminal may measure signal qualities of the serving cell and the neighbor cell. As an example of the signal quality, the terminal may measure reference signal received power (RSRP). In addition to the RSRP, various representative values may be used as the signal qualities of the serving cell and the neighbor cell.

A measurement result satisfying event A3 may be detected on the basis of the measurement result. In case that the RSRP measurement result of the neighbor cell is larger than a sum of the RSRP measurement result of the serving cell and an offset, it is determined that event A3 is satisfied. The terminal starts a timer. In the embodiment of FIG. 4, the timer may be 128 ms. In case that the RSRP measurement result of the neighbor cell is larger than the sum of the RSRP measurement result of the serving cell and the offset even at a time point at which the timer expires, the terminal may report the measurement result of the serving cell and the neighbor cell or information indicating that event A3 is generated to the base station. The terminal may start a new timer. For example, the new timer may be 480 ms. In case that the new timer expires, the terminal may report the measurement result again.

Meanwhile, for information that should be configured for the measurement report, other pieces of information may be additionally considered.

A new value may be used as a value that should be considered in the event. For example, a synchronization signal (SS) value and a CSI-RS value may be used, and the SS value and the CSI-RS value may be compared, respectively.

Operations having various representative values such as RSRP, RSRQ, CQI, and RSSI may be added and changed.

Different methods may be applied depending on a frequency band. For example, beam-specific conditions may be separated according to analog beamforming and hybrid beamforming based on whether it is below 6 GHz or above 6 G.

Δoffset value may be determined as one or more values.

Handover may be performed when a beam pair link (BPL) satisfies a condition in which one or a plurality of beams are determined.

In an embodiment of the disclosure, the case below 6 GHz and the case above 6 GHz are separately described. The reference of 6 GHz is only an example, and the operation may be separated on the basis of another frequency as the reference. In the case above 6 GHz, a scenario such as analog beamforming/hybrid beamforming may be supported. In the case below 6 GHz, a scenario such as a single beam may be supported like in LTE. The frequency below 6 Hz may be, for example, a band of about 3.5 GHz to 6 GHz. The embodiment of the disclosure mainly describes a part required for the operation of measuring the neighbor cell in such a situation. In the embodiment of the disclosure, the terminal of the serving cell may perform a process of receiving, measuring, and reporting an SS or a CSI-RS according to signaling of the base station (for example, a gNB or a TRP) of the serving cell. The terminal basically follows signaling of the serving base station, and a measurement and report operation of the terminal for the neighbor cell according to signaling to the neighbor base station (for example, a neighbor gNB or a neighbor TRP) or signaling from the neighbor base station is additionally described.

Figure 5:
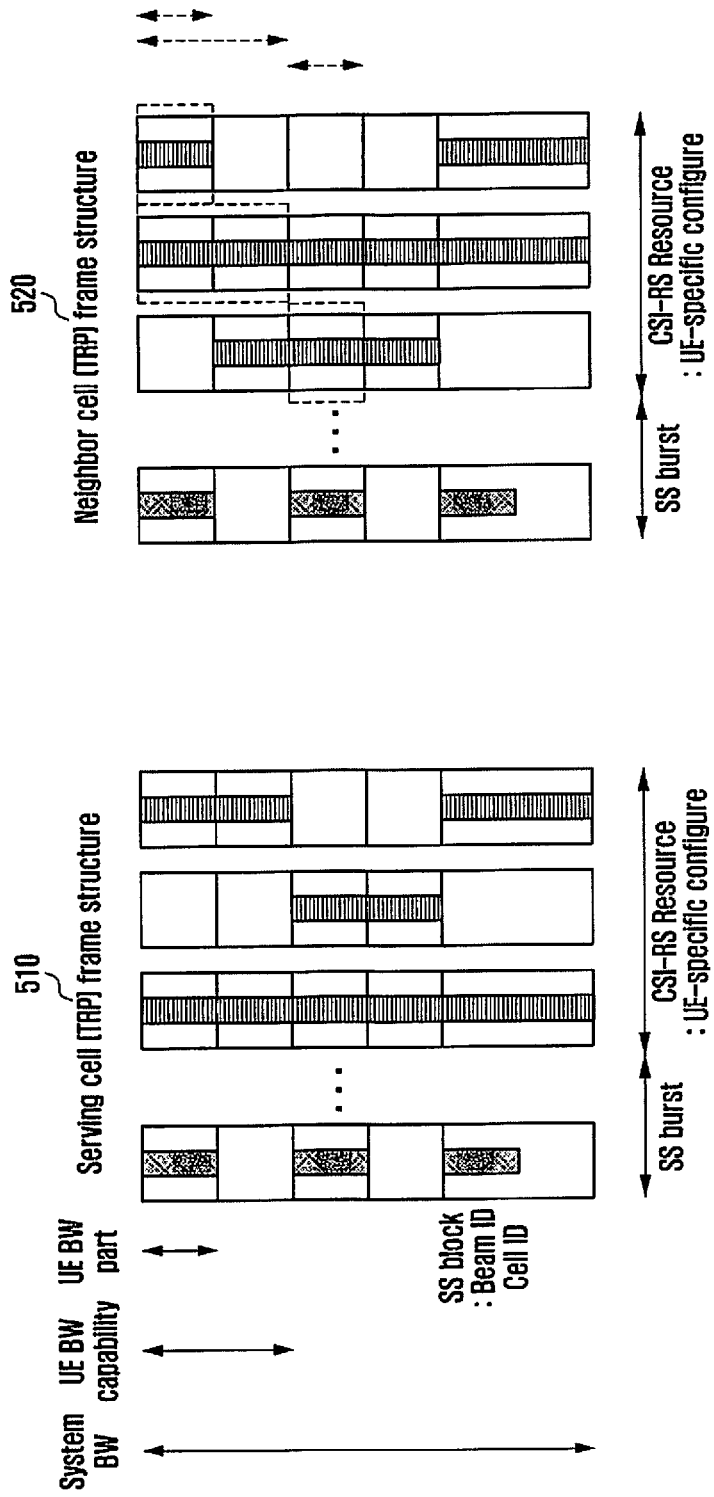
FIG. 5 illustrates a frame structure according to an embodiment of the disclosure.

FIG. 5 illustrates a frame structure according to an embodiment of the disclosure.

Reference numeral 510 indicates a frame structure of the serving cell, and reference numeral 520 indicates a frame structure of the neighbor cell. A system bandwidth (BW) indicates a frequency band supported by the cell, a terminal bandwidth capability (UE BW capability) indicates a bandwidth which can be supported by the terminal according to terminal capability, and a terminal bandwidth part (UE BW part) indicates a frequency band which the UE should measure or monitor in the system bandwidth. The terminal bandwidth part may be configured within a range in which the terminal bandwidth capability is satisfied. In the frame structure indicated by reference numeral 520, a dotted box corresponds to an example of a terminal bandwidth part which can be configured in the neighbor cell, but the configurable terminal bandwidth part is not limited thereto. In NR, system bandwidths of serving cell and the neighbor cell may be the same as or different from each other. The serving cell and the neighbor cell may have the configuration of the SS burst and the CSI-RS in the frequency band, which is different from that in FIG. 5. The SS burst may include at least one SS block. The SS block may include a PSS, an SSS, and a PBCH. The PBCH may include a DMRS. A plurality of SS bursts may be referred to as an SS burst set. In the frame structures indicated by reference numeral 510 and reference numeral 520, a horizontal axis indicates a time domain and a vertical axis indicates a frequency domain. In the frame structures indicated by reference numeral 510 and reference numeral 520, the time domain may be divided into a time domain in which the SS burst is transmitted and a time domain in which the CSI-RS is transmitted. In the frame structures indicated by reference numeral 510 and reference numeral 520, the SS burst and the CSI-RS may be continuously or discontinuously mapped. In the frame structure of FIG. 5, a part in which no mapping is performed in a frequency domain corresponding to a time domain in which the SS burst is transmitted is an area in which the SS burst is not transmitted in the frequency domain, and a part in which no mapping is performed in a frequency domain corresponding to a time domain in which the CSI-RS is transmitted is an area in which the CSI-RS is not transmitted in the frequency domain.

Figure 6:
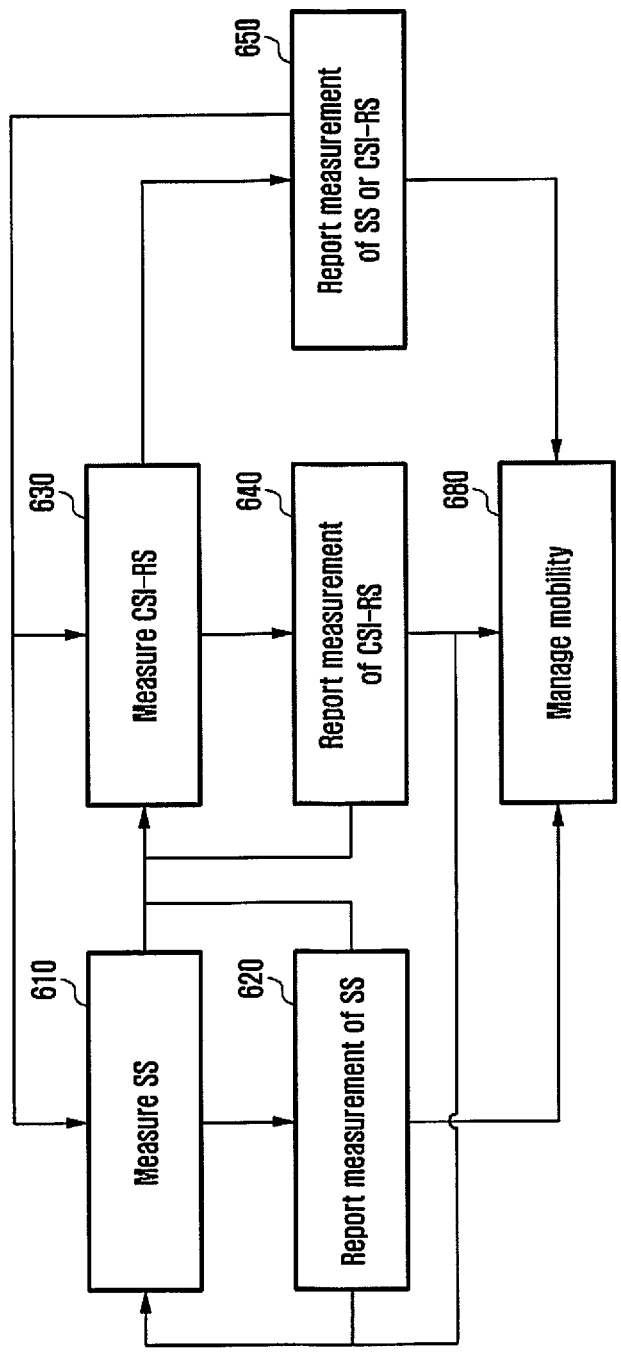
FIG. 6 illustrates the measurement and measurement report operation of the terminal according to an embodiment of the disclosure.

FIG. 6 illustrates the measurement and measurement report operation of the terminal according to an embodiment of the disclosure.

In the embodiment of FIG. 6, the measurement and measurement report operation of the terminal in, for example, the case below 6 GHz is described. In the embodiment of FIG. 6, the terminal may report the measurement result on the basis of SS burst measurement, report the measurement result on the basis of CSI-RS measurement, and report the measurement result on the basis of SS burst measurement and CSI-RS measurement.

In operation 610, the terminal may measure a signal included in SS block/SS burst/SS burst set/SS block series of the neighbor cell. The terminal may also measure a signal included in SS block/SS burst/SS burst set of the serving cell. In the single beam scenario, both the serving cell and the neighbor cell may perform measurement of the serving cell and the neighbor cell on the basis of the signal included in SS block/SS burst/SS burst set/SS block series.

In operation 620, the terminal may compare the measurement result of the serving with the measurement result of the neighbor cell, determine whether to transmit the measurement result, and transmit the measurement result. Further, the terminal may use the measurement result to measure the CSI-RS in the future.

A reference for measuring and comparing the signals of the serving cell and the neighbor cell may be required.

The measurement of the serving cell may correspond to the measurement of a TRP for transmitting a signal to the terminal by the serving cell. The measurement of the neighbor cell may correspond to the measurement of a TRP for transmitting a signal to the terminal by the neighbor cell. At this time, at least one representative/intermediate/average/sample value measured by the serving cell may correspond to a value selected by the serving cell among from at least one representative/intermediate/average/sample value measured by the neighbor cell. In case that the measurement result is used for handover, the serving cell may be referred to as a source base station or a source cell, and the neighbor cell may be referred to as a target base station or a target cell. The SS block may include a set of at least one PSS, SSS and PBCH in the time domain. A signal of the SS block used for cell-based measurement may be an SSS. In another embodiment, a signal of the SS block used for cell-based measurement may be a DMRS of the PBCH. In another embodiment, a signal of the SS block used for cell-based measurement may be a DMRS of the PBCH. In another embodiment, a method of combining the SSS and the DMRS of the PBCH in the SS block may be used for cell-based measurement. That is, in the disclosure, the measurement value of the SS block of the serving cell and the measurement value of the SS block of the neighbor cell may be measured and compared on the basis of the same reference. The terminal may measure and compare signals of the serving cell and the neighbor cell on the basis of the same reference such as a representative/intermediate/average/sample value.

In another embodiment, the SS block may be replaced with an SS burst, an SS burst set, or SS block series which is a set of SS blocks. This may be repeated in the time domain, distributed periodically/aperiodically, and measured by the terminal.

In another embodiment, the terminal may report each of the results measured by one base station of the serving cell or at least one TRP or a value obtained by operating the measured results to the base station. For example, in case that the serving cell is connected to two or more TRPs, measurement may be performed using at least one SS block/SS burst/SS burst set/SS block series of each TRP, and the measurement may be reported to the same TRP having performed the measurement or a different connected TRP having performed the measurement.

According to another embodiment, one base station of the neighbor cell or a TRP of at least one neighbor cell may report each of measurement results or a value obtained by operating the measurement results to the base station. In addition, a plurality of TRP set candidates may be reported for a plurality of TRP operations.

Through the method, the terminal may measure SS blocks, SS bursts, SS burst sets/SS block series of the serving cell and the neighbor cell and trigger a measurement report on the basis of the measurement, and the base station receiving the measurement report from the terminal may perform an operation for managing mobility of the terminal in operation 680. For example, the base station may determine handover of the terminal.

Next, an operation performed in consideration of the CSI-RS is described.

In operation 630, the terminal may measure a CSI-RS of the neighbor cell. The terminal may also measure a CSI-RS of the serving cell. When measuring the CSI-RS, the terminal may use SS block/SS burst/SS burst set/SS block series measurement of operation 610.

In operation 640, the terminal may compare CSI-RS measurement of the serving cell and CSI-RS measurement of the neighbor cell, determine whether to transmit a measurement report, and transmit the measurement report. Further, the terminal may determine whether to transmit a measurement report using SS block/SS burst/SS burst set measurement of operation 610 and CSI-RS measurement.

A reference for measuring and comparing the signals of the serving cell and the neighbor cell may be required.

According to an embodiment of the disclosure, CSI-RS measurement of the serving cell may be compared with a representative/intermediate/average/sample moving window operation value on the basis of the same reference as the CSI-RS of the neighbor cell. In addition, a different reference may be applied. The different reference may be a threshold value.

First, an operation for the frequency domain is described. In case that the bandwidth part of the serving cell measured by the terminal is the same as the bandwidth of the neighbor cell in the frequency domain, measurement and a report may be performed by applying the same hysteresis to resources configured in the terminal. For example, in case that the UE bandwidth part of the serving cell is the same as the UE bandwidth part of the serving cell, the terminal may perform operations 630 and 640 by applying the same hysteresis value. In case that the bandwidth of the serving cell measured by the terminal is different from the bandwidth of the neighbor cell in the frequency domain, measurement of the serving cell may be compared with measurement of the neighbor cell by sampling, transforming, and compensating for some values. For example, in case that the UE bandwidth part of the serving cell is different from the UE bandwidth part of the serving cell, the terminal may apply different hysteresis.

A BW adaptation concept may be applied to the UE bandwidth part in the 5G NR system. On the basis thereof, an RF part (bandwidth RF region) in which the terminal operates an RF may be applied differently for each cell, and frequencies in which the terminal operates the RF may be different in the serving cell and the neighbor cell. In case that the frequency bandwidth of the serving cell measured by the terminal is different from the frequency bandwidth of the neighbor cell in the frequency domain, the measured value of the serving cell and the measured value of the neighbor cell may be compared by sampling, transforming, or compensating for some values. According to another embodiment, in case that beam measurement or RRM measurement is needed for the entire system bandwidth of the neighbor cell, the beam measurement or the RRM measurement for the entire system bandwidth may be performed through a plurality of configurations and reports within a range in which UE capability can be applied.

The terminal may use, for example, the following values, as a measured value of the CSI-RS.

RSSI (received signal strength indication): average total received power observed only in OFDM symbols containing reference symbols for antenna port 0 in the measurement bandwidth over N resource blocks RSRP (reference signal received power): linear average of power distribution of a source element including a cell-specific reference signal within the bandwidth in units of Watts.

RSRQ (reference signal received quality): N×RSRP/(E-UTRA carrier RSSI)

N is the number of resource blocks within a measurement bandwidth of E-UTRAN carrier RSSI. Both the numerator (RSRP) and the denominator (RSSI) defining RSRQ are measured in the same resource block.

In the time domain, time areas of the serving cell and the neighbor cell in which the CSI-RS is configured may be the same as or different from each other. In case that the CSI-RS is measured in the same period and time in the serving cell and the neighbor cell, the measured value may be compared with the same representative/intermediate/average/sample value.

In case that the CSI-RS configuration of the serving cell and the CSI-RS configuration of the neighbor cell are different in the time domain, values measured during different periods and times may be compared via some operation processes. The operation processes may be implemented in the form of sampling, average, and moving window. In another example, the CSI-RS transmitted by the TRP of the neighbor cell may be measured in the form RSRP, CQI, or SINR/CINR using a zero power (ZP) CSI-RS of the serving base station. In addition, the CSI-RS transmitted by the TRP of the neighbor cell may be measured in the form of RSRP, CQI, or SINR/CINR using a non-zero power (ZP) CSI-RS of the serving base station.

Through the method, the terminal may measure the CSI-RSs of the serving cell and the neighbor cell and trigger a measurement report on the basis of the measurement, and the base station receiving the measurement report from the terminal may perform an operation for managing mobility of the terminal in operation 680. For example, the base station may determine handover of the terminal.

The report processes 620, 640, and 650 may be immediately performed when the trigger condition is satisfied after the measurement processes or performed when the trigger condition is satisfied by accumulated measurement. The SS measurement and the CSI-RS measurement may be separately performed and then reported (operation 620 and operation 640 may be separately performed), the CSI-RS measurement and report may be sequentially performed on the basis of the SS measurement and/or the SS report (operation 630 and/or operation 640 may be performed after operation 610 and/or operation 620), or the SS and/or CSI-RS measurement result may be reported at once like in operation 650.

In operation 680, the base station may manage mobility after at least one SS measurement and SS report received from the terminal, manage mobility after at least one CSI-RS measurement and CSI-RS report received from the terminal, or manage mobility after at least one SS measurement, CSI-RS measurement, SS report, and CSI-RS report received from the terminal. The base station receiving the report on the measurement result from the terminal may perform the terminal mobility management operation. For example, in case that a handover condition of the terminal is satisfied, the base station may indicate the handover to at least one cell of candidate cells or a TRP. The mobility management operation may be performed not only by the base station but also by the terminal. For example, the terminal determines the handover on the basis of measurement and transmits a message that makes a request for performing a handover procedure to the base station.

Figure 7:
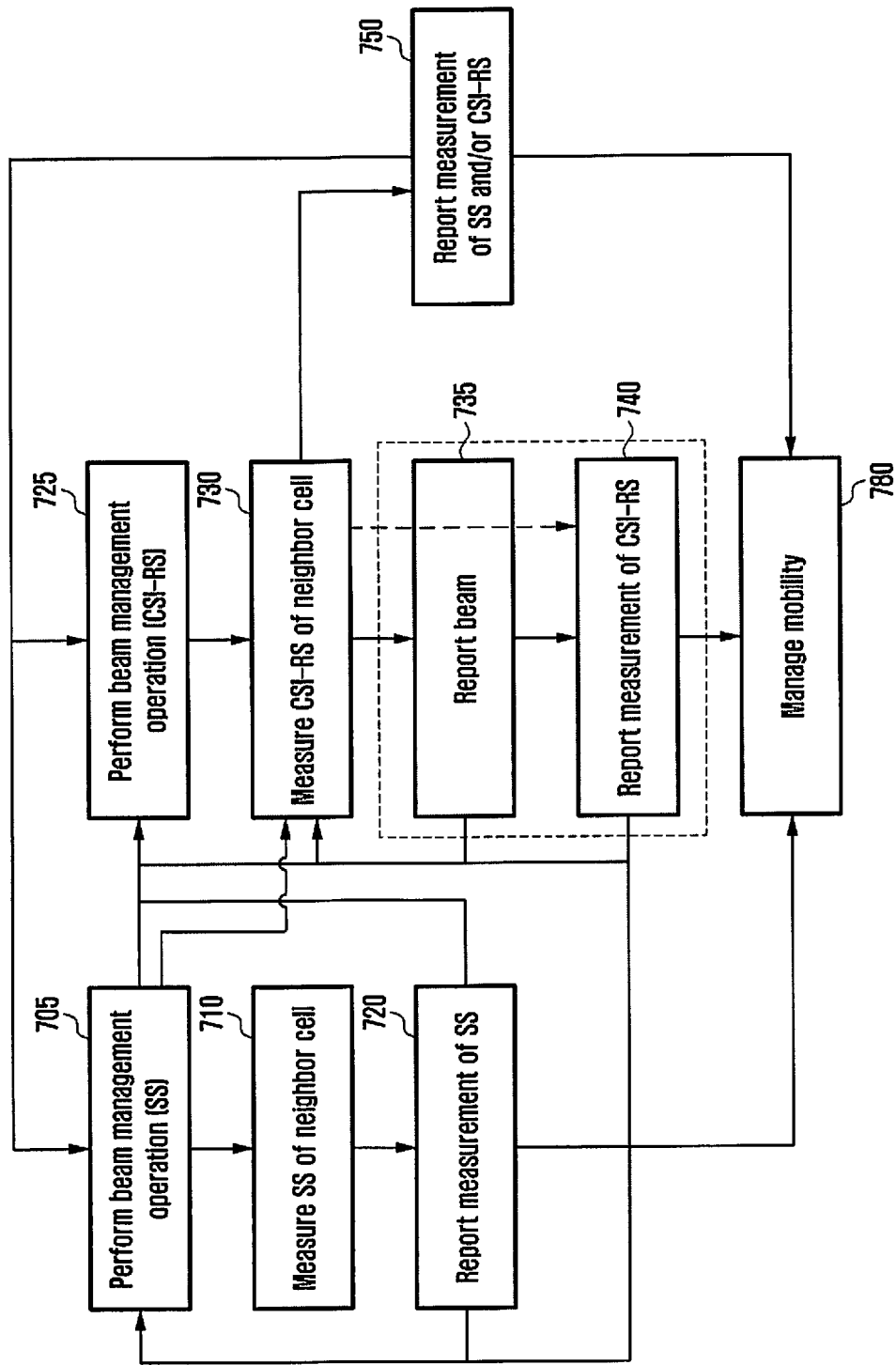
FIG. 7 illustrates the measurement and measurement report operation of the terminal according to another embodiment of the disclosure.

FIG. 7 illustrates the measurement and measurement report operation of the terminal according to another embodiment of the disclosure.

In the embodiment of FIG. 7, the measurement and measurement report operation of the terminal in the case above 6 GHz is illustrated. The operation in a band above 6 GHz does not have to be determined by a frequency but may be performed on the basis of identification of a broadcasted or multicasted signal of the base station. In the embodiment of FIG. 7, the terminal may report the measurement result on the basis of SS block/SS burst measurement, report the measurement result on the basis of CSI-RS measurement, or report the measurement result on the basis of SS block/SS burst measurement and CSI-RS measurement.

In the band above 6 GHz, the base station uses analog beamforming/hybrid beamforming, and thus a part supporting multiple beams may be different from that in the embodiment of FIG. 6. The operation in the scenario of FIG. 7 using multiple beams may have a process which is the same as or is different from the signal beam scenario described in the embodiment of FIG. 6. The same process may refer to the description of FIG. 6, and the different process is mainly described in the embodiment of FIG. 7.

The band above 6 GHz uses multiple beams and thus a beam pair link (BPL), that is, a spatial BPL between the base station and the terminal is basically needed to receive the SS and the CSI-RS. The BPL may be generated by performing TX beamforming of the TRP and RX beamforming of the terminal in the downlink and RX beamforming of the TRP and TX beamforming of the terminal in the uplink, so as to temporally and spatially sweep the beams. For the beamforming operation, refer to the description in FIG. 2. In the embodiment of FIG. 7, it is assumed that the terminal sweeps beams of the serving cell and then performs an operation of measuring SS block/SS burst/SS burst set/SS block series. Further, it is assumed that the terminal sweeps beams of the serving cell and then performs an operation of measuring the CSI-RS. On the basis of the assumption of the operation, an operation of providing a measurement report using measurement of the neighbor cell and a measurement result of the neighbor cell is described in the following embodiment.

In operation 705, the terminal performs an operation of managing beams of the neighbor cell. The terminal may identify SS beams of the neighbor cell while sweeping the beams. For example, the terminal may sweep reception beams, and the base station may generate a BPL while sweeping transmission beams. According to an embodiment, a beam sweeping operation for the SS block may be performed through a process P1 on the basis of a period of 20 ms. The process P1 is a concept for describing the operation in which the base station and the terminal sweep beams of each other as a general procedure. According to another embodiment, the serving base station may configure a period in the terminal through separate signaling. For example, the period may be at least one of 5, 10, 20, 40, 80, and 160 ms. The process P1 may be performed to receive an SS beam. During the process P1, an approximate coarse beam-based BPL may be generated. The process P1 may be a process of generating a coarse beam-based BPL while sweeping reception beams of the terminal for each transmission beam of the base station or generating a coarse beam-based BPL while sweeping transmission beams of the base station for each reception beam of the terminal. After the coarse beam is generated in the process P1, a process P2 may be performed. In the process P2, transmission beams of the gNB/TRP may be swept during a sub time unit (STU), and the terminal may fix and use beams during a time unit (TU). A plurality of STUs may correspond to one TU. The process P2 is a concept for describing an operation of controlling beams in order to change beams of the base station and the terminal as a general procedure.

In operation 710, the terminal may measure an SS. The terminal may measure a signal included in SS block/SS burst/SS burst set/SS block series. The terminal may perform an SS measurement operation on the basis of the BPL. The terminal may receive a list of neighbor base stations and information on SS block timing for measurement of SSs of the neighbor base stations from the serving base station. The terminal may measure SSs of the neighbor base stations on the basis of information on the neighbor base stations and the SS block timing from the serving base station. According to an embodiment, in time-frequency domains, the SS block (PSS/SSS/PBCH) may exist in a plurality of regions on the basis of the assumption of a narrow band UE. At this time, the terminal may perform measurement using at least one signal of the detected SSs. At least one signal may include a PSS, an SSS, and a DMRS within the PBCH. At least one SS may be detected within UE bandwidth capability. According to another embodiment, in case that a plurality of SSs are detected, the SSs may be measured and/or reported for each frequency or by calculating the average of measured values.

In operation 720, the terminal may report the measurement result of the SS to the base station. According to an embodiment, a report period may be a default period signaled by the base station or an average value of sets of default periods, or may be calculated through the operation of a moving window. Further, in case that a preset measurement report condition is satisfied, the measurement result may be reported to the base station. The terminal may compare measurement results of the serving cell and the neighbor cell, determine whether to transmit a measurement report, and transmit the measurement report. Further, the terminal may use the measurement result to measure the CSI-RS in the future.

In the embodiment of FIG. 7, in case that the SS measurement results and the CSI-RS measurement results of the serving cell and the neighbor cell are compared, the comparison may be performed basically on the basis of the same comparison reference like in FIG. 6.

The base station receiving the measurement report from the terminal may perform an operation for managing mobility of the terminal in operation 780. For example, the base station may determine handover of the terminal.

Next, an operation performed in consideration of the CSI-RS is described. In operation 730, the terminal may perform a CSI-RS beam sweeping operation in order to manage beams. The beam sweeping operation may be performed through processes P1, P2, and P3 on the basis of downlink/uplink and time duration, and a spatial beam width. The process P1 may be a process of generating a coarse beam-based BPL while sweeping reception beams of the terminal for each transmission beam of the base station or generating a coarse beam-based BPL while sweeping transmission beams of the base station for each reception beam of the terminal. After the coarse beam is generated in the process P1, a process P2 may be performed. In the process P2, transmission beams of the gNB/TRP may be swept during a sub time unit (STU), and the terminal may fix and use beams during a time unit (TU). In the process P3, reception beams of the terminal may be swept during a sub time unit (STU), and the base station may fix and use beams during a time unit (TU).

SS-based beam sweeping and CSI-RS-based beam sweeping may be performed through the same operation. To this end, beams for the SS block and beams for the CSI-RS may be generated on the basis of the same spatial beam width, and it may be considered that there is an implicit mapping relationship. In order to perform beam sweeping on the SS and the CSI-RS at once through the same operation, the base station may allocate CSI-RS resources to the vicinity of an SS resource area.

According to another embodiment, the SS-based beam sweeping may be performed separately from the CSI-RS-based beam sweeping. The terminal may first perform SS-based coarse beam-based beam sweeping and then perform CSI-RS beam sweeping on the basis of the SS beam sweeping. The terminal may perform beam sweeping on the basis of implicitly mapped narrow beams based on SS beams. That is, the SS beam corresponds to a relatively wide beam compared to the CSI-RS, and thus a coarse wide beam may be determined through the SS beam, and CSI-RS-based narrow beam sweeping may be performed on the basis of the coarse wide beam result. As described above, in order to perform the separate operation, CSI-RS resources may be allocated time and frequency domains separated from SS resources. For example, a slot for the period of the SS may end, and resource areas for CSI-RS beam sweeping may be subsequently allocated. The CSI-RS beam sweeping operation may be configured periodically or aperiodically.

In operation 740, the terminal may perform a CSI-RS measurement operation. A method such as single beam CSI-RS measurement described with reference to FIG. 6 may be applied to the measurement operation based on multiple beams. Meanwhile, the CSI-RS-based beam measurement operation may be performed during the CSI-RS beam sweeping process. The terminal may not only generate a BPL based on the CSI-RS beam but also measure the CSI-RS beam in the beam sweeping process.

According to an embodiment of the disclosure, the CSI-RS-based beam measurement operation may be performed after CSI-RS measurement for RRM. In order to be performed as separate processes, the CSI-RS for beam measurement and the CSI-RS for RRM measurement may be designed in separate time and frequency domains. According to another embodiment, the CSI-RS for beam measurement and the CSI-RS for RRM measurement may be designed through separate ports.

For example, CSI-RS configurations may be separated as shown in [Table 1].

TABLE 1

| CSI RS setting type | Configuration |
| --- | --- |
| A1 | CSI-RS configuration for beam measurement for terminal of neighbor cell |
| A2 | CSI-RS configuration for beam measurement for terminal of serving cell |
| B1 | CSI-RS configuration for RRM measurement for terminal of neighbor cell |
| B2 | CSI-RS configuration for RRM measurement for terminal of serving cell |
| C1 | CSI-RS configuration for beam measurement/RRM measurement for terminal of neighbor cell (retransmission) |
| C2 | CSI-RS configuration for beam measurement/RRM measurement for terminal of serving cell (retransmission) |

[Table 1] is only an example of the CSI-RS configuration but the CSI-RS configuration is not limited thereto.

[Table 2] shows an example of the CSI-RS configuration and CSI report periodicity.

TABLE 2

| | | CSI reporting | | |
| --- | --- | --- | --- | --- |
| | | Periodic | Semi-persistent | Aperiodic |
| CSI-RS transmission | Periodic | CSI-RS: N/A Reporting: N/A | CSI-RS: N/A Reporting: RRC or DCI | CSI-RS: N/A Reporting: DCI |
| | Semi-Periodic | Not supported | CSI-RS: RRC or DCI Reporting: RRC or DCI | CSI-RS: RRC or DCI Reporting: DCI |
| | Aperiodic | Not supported | Not supported | CSI-RS: DCI Reporting: DCI |

[Table 2] is only an example of the CSI-RS configuration and the CSI report period, but the CSI-RS configuration and the CSI report period are not limited to the configuration in [Table 2].

According to an embodiment, the neighbor base station may configure the CSI-RS for beam measurement of the terminal for the purpose of RRM measurement for L3 mobility. CSI-RS setting type A1 information configured for the purpose may be used, and the neighbor base station may share the CSI-RS setting type A1 information with adjacent base stations. This may be referred to as a process of sharing configuration information by the base station. The serving cell of the terminal with which the neighbor base station shares CSI-RS setting type A1 information may allow the terminal to measure the CSI-RS transmitted by the neighbor cell by sharing the CSI-RS setting type A1 information with the terminal. As an interface for transmitting information between base stations, an interface X2 or an interface Xn may be used.

In another embodiment, the neighbor base station may share preset CSI-RS (for example, CSI-RS setting type A2) configuration information with the serving base station in order to measure beams of the terminal belonging to the base station. As an interface for transmitting information between base stations, an interface X2 or an interface Xn may be used.

According to another embodiment, the neighbor base station may configure the CSI-RS for the purpose of RRM measurement for L3 mobility. The CSI-RS (for example, CSI-RS setting type B1) configuration information set for the purpose may be shared with neighbor base stations. In another embodiment, the neighbor base station may share preset CSI-RS (for example, CSI-RS setting type B2) configuration information with the neighbor base station in order to measure RRM of the terminal belonging to the base station. For example, the neighbor base station may transmit the information to the serving base station. The serving base station may allow the terminal to measure the CSI-RS transmitted by the neighbor cell by sharing CSI-RS configuration information of the neighbor cell with the terminal.

According to another embodiment, a CSI-RS-based beam measurement process may be performed along with a CSI-RS beam sweeping process. The neighbor base station may configure CSI-RSs for both RRM measurement and beam measurement for L3 mobility. This may be performed to reduce a disadvantageous delay that may be caused in a design using the configured CSI-RS. In addition, a separate structure CSI-RS pattern may be used when the CSI-RS setting type A and B-based measurement operation fails and thus measurement is performed again. In this case, the neighbor base station may configure CSI-RS setting type C1 and C2 and transmit information thereon to the serving base station.

Meanwhile, it has been described that the terminal of the serving base station mainly receives CSI-RS configuration information of the neighbor base station through the serving base station, but the terminal may receive the CSI-RS configuration information through information broadcasted by the serving base station.

In operation 735, the terminal may transmit a beam report. For example, the terminal may report a beam in accordance with CSI-RS beam sweeping of the neighbor cell in operation 725. The terminal may report a beam sweeping result of the neighbor cell to the serving cell. Operation 735 may be performed before or after operation 730.

In operation 740, the terminal transmits a CSI-RS measurement report. The terminal may transmit the CSI-RS measurement report on the basis of CSI-RS measurement of operation 730. The terminal may transmit the CSI-RS measurement report on the basis of CSI-RS measurement of the serving cell and CSI-RS measurement of the neighbor cell.

Operations 735 and 740 may be performed as a single operation. Operations 735 and 740 may be performed as a single operation after operations 725 and 730 are separately performed, or operations 735 and 740 may be performed as a single operation after operations 725 and 730 are performed at the same time.

The report processes 720, 740, and 750 may be immediately performed when the trigger condition is satisfied after the measurement processes or performed when the trigger condition is satisfied by accumulated measurement. The SS measurement and the CSI-RS measurement may be separately performed and then reported (operation 720 and operation 740 may be separately performed), the CSI-RS measurement and report may be sequentially performed on the basis of the SS measurement and/or the SS report (operation 730 and/or operation 740 may be performed after operation 710 and/or operation 720), or the SS and/or CSI-RS measurement result may be reported at once like in operation 750.

In operation 780, the base station may manage mobility after at least one SS measurement and SS report is received from the terminal, manage mobility after at least one CSI-RS measurement and CSI-RS report is received from the terminal, or manage mobility after at least one SS measurement, CSI-RS measurement, SS report, and CSI-RS report is received from the terminal. The base station receiving the report on the measurement result from the terminal may perform the terminal mobility management operation. For example, in case that a handover condition of the terminal is satisfied, the base station may indicate the handover to at least one cell of candidate cells or a TRP. The mobility management operation may be performed not only by the base station but also by the terminal.

Figure 8:
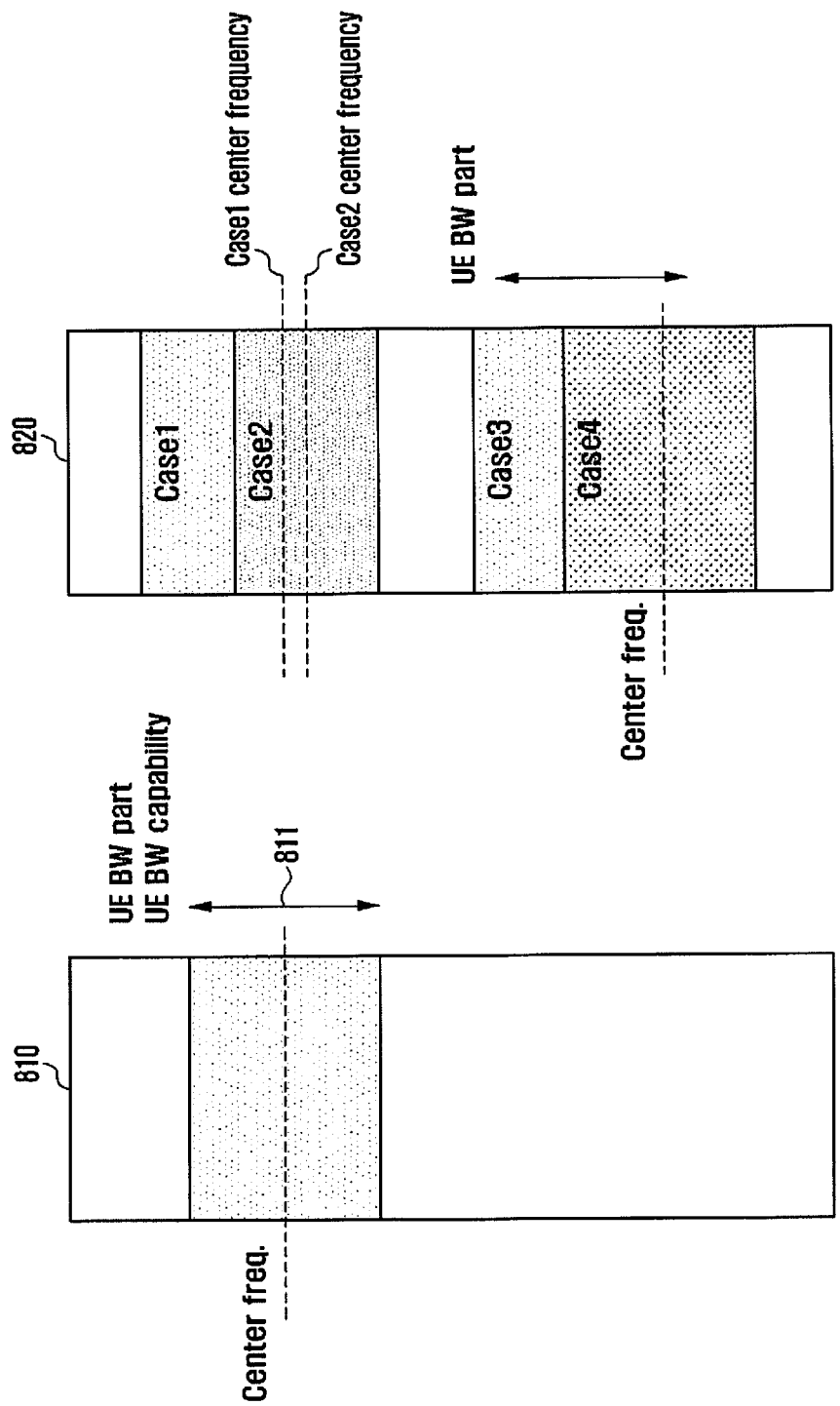
FIG. 8 illustrates a scenario of bandwidths of a serving cell and a neighbor cell according to an embodiment of the disclosure.

Subsequently, a terminal bandwidth part and bandwidth performance which can be applied to each embodiment of the disclosure, and a measurement operation related thereto will be described. In case that a bandwidth part to be measured and/or a center frequency is changed according to configurations of the serving cell and the neighbor cell, the terminal may need a measurement gap. Further, when the center frequency is changed, a larger measurement gap may be needed. The serving base station FIG. 8 illustrates a scenario of bandwidths of the serving cell and the neighbor cell according to an embodiment of the disclosure. In FIG. 8, reference numeral 810 indicates a scenario of a bandwidth of the serving cell, and reference numeral 820 indicates a scenario of a bandwidth of the neighbor cell.

First, the serving cell and the neighbor cell may operate bandwidth parts. A UE bandwidth part configured within the serving cell at a specific time may have a bandwidth part smaller than UE capability, and the UE bandwidth part may be equally applied in units of groups of predetermined cells. Accordingly, signaling may be reduced to support handover and mobility, and resources of a neighbor cell group may be managed in the form of a table. As illustrated in FIG. 8, it is assumed that the terminal receives allocation of a serving cell bandwidth part 811 from the serving cell. The base station of the serving cell may perform signaling to the neighbor cell to allocate band width part resources which are the same as the serving cell to the neighbor cell in order to search for the RRM for the neighbor cell. For the signaling, base stations may use an interface between the base stations such as an interface X2 or an interface Xn. The serving base station and the neighbor base station may share and negotiate CSI-RS resource state information through the interface between base stations. Sharing of CSI-RS resources means that each cell first performs a CSI-RS configuration process and transmits information on the CSI-RS configuration to the neighbor cell. At this time, the transmitted information may include at least one of a past configuration value, a current configuration value, and a future configuration value. Negotiation may include an operation of sharing information between the serving cell and the neighbor cell (an operation of transmitting and/or receiving information) and controlling CSI-RS resources by the neighbor cell on the basis of the shared information.

When a beam or a CSI-RS for L3 mobility is not properly configured in the neighbor cell, the serving cell may negotiate with the neighbor cell to allow the terminal of the serving cell to properly measure the CSI-RS of the neighbor cell. The negotiation may be a request for configuring CSI-RS resources to the neighbor cell to correspond to a UE bandwidth part of the terminal of the current serving cell in order to measure RRM of the terminal of the serving cell. The serving cell may provide information on the UE bandwidth part of the terminal of the serving cell to the neighbor cell. The neighbor cell may allocate beams or resources to allow the terminal of the serving cell to measure the neighbor cell on the basis of information on the UE bandwidth part received from the serving cell. In the allocation operation, the beam or RRM may be rapidly measured using the CSI-RS of the beam or the resources of the neighbor cell without a change in the center frequency of the terminal, and thus a measurement resource gap generated due to the change in the center frequency is not needed or a little measurement gap may be allocated.

Subsequently, the case in which serving cell and the neighbor cell operate different bandwidth parts is described.

A UE bandwidth part allocated at a specific time point within the serving cell may have a bandwidth smaller than UE capability, and the UE bandwidth part may be applied differently in units of predetermined cells or cell groups. In this case, signaling may be increased to support handover and mobility, and there may be a difficulty in managing resources of the neighbor cell group in the form of a table. On the other hand, it is possible to increase the degree of freedom by dynamically allocating and configuring resources to be suitable for the number of terminals serviced by each cell or the resource state of the cell.

The serving cell and the neighbor cell may share resource configuration information such as a bandwidth part of the serving cell, UE capability of the terminal of the serving cell, and a bandwidth part of the neighbor cell, and the serving cell may negotiate with the neighbor cell for RRM measurement of the terminal of the serving cell according to the following case.

As indicated by reference numeral 810 of FIG. 8, a UE bandwidth part may be configured for the terminal of the serving cell. UE bandwidth parts of the neighbor cell may be configured as shown in cases 1, 2, 3, and 4 as indicated by reference numeral 820. Case 1 corresponds to the case in which the bandwidth part of the neighbor cell is larger than UE capability of the terminal of the serving cell. In this case, the serving cell may negotiate the bandwidth part of the neighbor cell. The serving cell may make a request for allocating or configuring a new bandwidth part such that the bandwidth part of the neighbor cell has a bandwidth smaller than a UE capability of the terminal of the serving cell.

Case 2 corresponds to the case in which the bandwidth part of the neighbor cell is smaller than a bandwidth part of the serving cell. In this case, the neighbor cell may perform control the UE bandwidth to correspond to the UE bandwidth of the serving cell.

Base stations may use an interface between base stations such as an interface X2 or an interface Xn. The serving base station and the neighbor base station may share and negotiate CSI-RS resource state information through the interface between base stations. Sharing of CSI-RS resources means that each cell first performs a CSI-RS configuration process and transmits information on the CSI-RS configuration to the neighbor cell. At this time, the transmitted information may include at least one of a past configuration value, a current configuration value, and a future configuration value.

The configuration value may be always statically allocated to a fixed region according to the same bandwidth size, semi-statistically configured to semi-periodically allocate the bandwidth size, or dynamically configured according to a demand of the terminal and a demand of the neighbor cell according to a short period. The allocation scenario may be operated in a band above 6 GHz, and may be combined and configured with beam information statically, semi-statically, or dynamically.

According to another embodiment, case 3 and case 4 correspond to the case in which the center frequency of the neighbor cell is changed compared to the bandwidth part of the serving cell. Case 3 corresponds to the case in which not only the center frequency is different but also the bandwidth part exceeds a capability of the terminal of the serving cell, and case 4 corresponds to the case in which the center frequency is different. For the control of the bandwidth part larger than the UE bandwidth part, refer to the above-described operation. When the center frequency to be measured by the terminal is changed, the terminal may additionally need a time of a measurement gap. When the terminal is scheduled, the terminal of the serving cell may make a configuration considering the measurement gap in the terminal and/or the neighbor base station. The measurement gap for the terminal may be a value by UE capability and may be controlled according to an operation report period and time point of the corresponding cell, or uplink control information (UCI).

Meanwhile, the beam measurement operation and the bandwidth part control operation may be performed together or performed after a beam pair link (BPL) is generated.

The following information may be transmitted between base stations through an interface X2 or Xn. The use of information will be described below.

NR Cell ID timing configuration, including time offset and periodicity number of antenna ports configurable time/frequency resource to indicate RE mapping configurable transmission/measurement bandwidth Note: it relates to wideband operation parameters for sequence generation configurable numerology Spatial QCL assumption e.g. QCL between SS block and CSI-RS SS Block frequency location SS Burst Set configuration and periodicity PRACH configuration Measurement object for NR carriers, including possible CSI-RS configuration for RRM measurements Signaling needed for timing synchronization and SFN alignment between LTE and NR The information may be included in information signaled to the terminal for beam measurement or RRM measurement.

Figure 9:
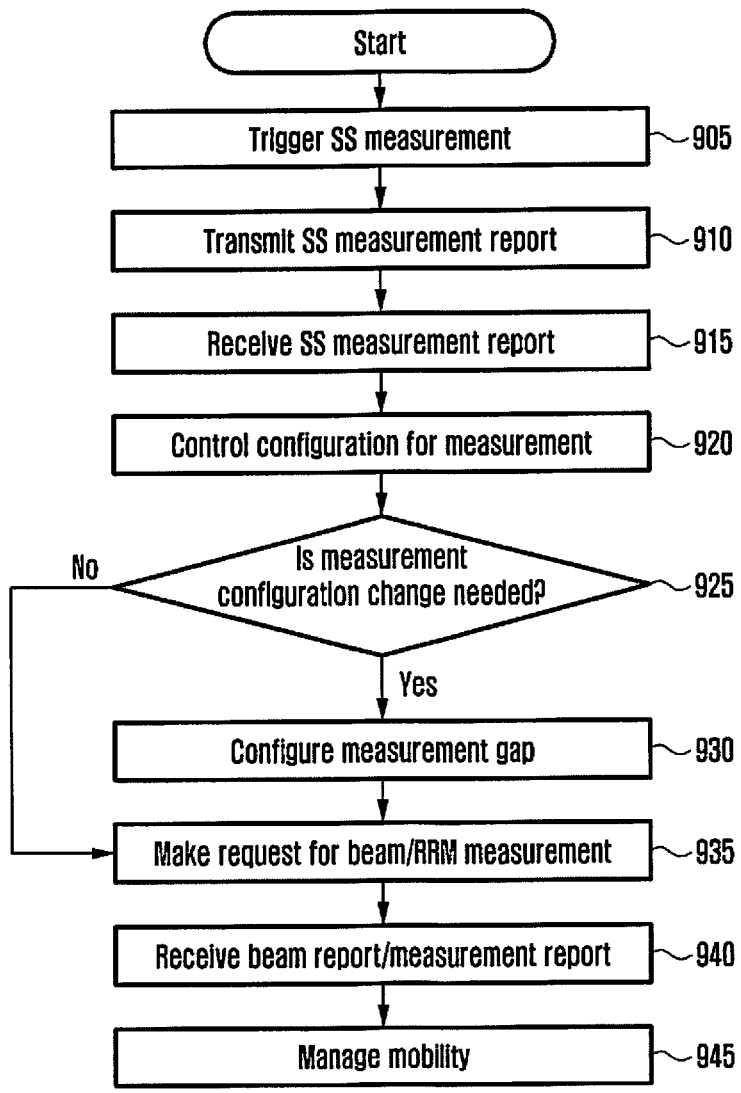
FIG. 9 illustrates the operation of a base station according to an embodiment of the disclosure.

FIG. 9 illustrates the operation of the base station according to an embodiment of the disclosure.

FIG. 9 corresponds to the operation of the serving cell. Referring to FIG. 9, in operation 905, the serving base station may trigger the operation for SS measurement. The SS measurement may correspond to measurement of a signal included in SS block/SS burst/SS burst set/SS block series. The serving base station may trigger SS measurement of the serving cell and SS measurement of the neighbor cell. The SS measurements of the serving cell and the neighbor cell do not have to be performed at the same time. The SS measurement of the serving cell may be performed or may be configured in advance, and the serving base station may trigger SS measurement of the neighbor cell. The serving base station may determine a cell and a beam to trigger SS measurement on the basis of information received from the neighbor base station. The serving base station may use information on a neighbor cell ID and candidate beam IDs received from the neighbor base station.

In operation 910, the serving base station may transmit an SS measurement request to the terminal. The SS measurement request may include an SS measurement request for the serving base station and an SS measurement request for the adjacent cell. The SS measurement request for the serving base station may be transmitted in advance, or the serving base station may transmit the SS measurement request for the neighbor cell. The SS measurement request may include information on an object which is a target of SS measurement, timing, a cell, and a beam. For example, a neighbor cell ID and an SS timing configuration may be included. Candidate beam IDs of a neighbor cell may be included. The SS timing configuration may include at least one of a time offset and periodicity.

In operation 915, the serving base station may receive the SS measurement report from the terminal. The SS measurement report may include an SS measurement result for the serving cell and/or an SS measurement report for the adjacent cell. The SS measurement result may be reported to the base station by the terminal in case that a preset report condition is satisfied. The SS measurement report may include information on a neighbor cell ID, a preferred SS beam, a beam identifier, a beam signal intensity, and a beam signal quality. As described in the embodiment, the serving base station may manage mobility of the terminal on the basis of the SS measurement report.

In step 920, the serving base station may control a configuration for measurement with the neighbor base station. The serving base station may perform operation 920 on the basis of the SS measurement report received from the terminal. A request for changing the configuration of the neighbor cell may be made according to the size of a bandwidth part configured in the terminal of the serving base station and a center frequency. For example, a request for controlling the center frequency to correspond to the center frequency of the bandwidth part configured in the serving cell, a request for controlling the size of the bandwidth part of the neighbor cell to correspond to bandwidth part performance of the terminal of the serving cell, or a request for changing CSI-RS configuration information may be made. The neighbor cell may control the center frequency and/or the bandwidth part and CSI-RS configuration information according to a request from the serving base station. In case that the center frequency or the bandwidth part is controlled, the neighbor cell may provide information thereon to the serving base station. The serving base station may control the configuration on the basis of the SS measurement report. The serving base station may make a request for controlling a configurable transmission/measurement bandwidth and configurable time/frequency resources to indicate RE mapping.

In addition, the serving base station and the neighbor base station may update the following information in operation 920 or constantly.

SS Block frequency location
SS Block frequency location
SS Burst Set configuration and periodicity
PRACH configuration
Measurement object for NR carriers, including possible CSI-RS configuration for RRM measurements
Signaling needed for timing synchronization and SFN alignment between LTE and NR In operation 925, the serving base station may determine whether a measurement configuration change is needed to measure the neighbor cell by the terminal. For example, it may be determined whether a change in the center frequency or in the bandwidth part is needed for measurement. The serving base station may identify whether a measurement configuration is needed on the basis of the size of the bandwidth part configured in the terminal belonging to the serving cell and the bandwidth part and the center frequency of the neighbor cell.

In case that the change in the measurement configured is needed, operation 930 may be performed. In case that the change in the measurement configuration is not needed, operation 935 may be performed. The case in which the change in the measurement configuration is needed may be the case in which a configuration should be changed to measure the neighbor cell by the terminal of the serving cell.

In operation 930, the serving base station may configure a measurement gap in the terminal. The serving base station may transmit information on the measurement gap to the terminal. In case that the change in the measurement configuration is needed, the terminal may need the measurement gap, and the serving base station may transmit information on the measurement gap to the terminal. As described above, in case that the change in the size of the bandwidth part or the change in the center frequency is needed, the measurement gap may be configured. In case that the change in the center frequency is needed, a measurement gap larger than a measurement gap configured when the change in the size of the bandwidth part is needed may be configured. Information on the measurement gap may be gap pattern ID information. The gap pattern ID information may be information for identifying a gap, and a gap pattern ID may correspond to a period of the gap. The gap pattern ID may correspond to information on a gap length and a gap repetition period. The time information may be in the unit of ms. For example, the gap length may be A ms and the gap repetition period may be B ms in case that the gap pattern ID is 0, and the gap length may be C ms and the gap repetition period may be D ms in case that the gap ID is 1. Information on the measurement gap may be transmitted in advance in which case operation 930 may be omitted, and the serving base station may provide information indicating whether to use the measurement gap transmitted in advance. For example, at least one gap pattern ID and information on a period corresponding thereto may be provided in advance to the terminal, and the serving base station may transmit information (for example, a gap pattern ID) indicating a measurement gap, which the terminal should measure, to the terminal. Meanwhile, the operation for transmitting information on the measurement gap to the terminal may be transmitted along with a request for performing measurement to the terminal in operation 935.

In operation 935, the serving base station may make a request for performing measurement to the terminal. The serving base station may transmit a measurement request message to the terminal. The measurement request may be a CSI-RS measurement request. The measurement request may include CSI-RS resource configuration information and information on a bandwidth to be measured. The serving base station may make a request for measuring a CSI-RS of the serving cell and/or a CSI-RS of the neighbor cell. In case that the terminal has already measured the CSI-RS of the serving cell, the serving base station may make a request for measuring the CSI-RS of the neighbor cell to the terminal. The serving base station may indicate measurement of at least one of a CSI RS for beam measurement and a CSI-RS for RRM measurement according to a configuration of the serving cell and the neighbor cell. For example, refer to types A, B, and C described above. A process of indicating measurement of the CSI-RS for beam measurement and a process of indicating measurement of the CSI-RS for RRM measurement may be separately performed.

The measurement request may include the following information.

The number of antenna ports for measurement (1 port—port for beam management, RRM measure)

Configurable time/frequency resource to indicate RE mapping within BWP

Numerology information

CRI

Spatial QCL-related indication

Gap pattern ID

CSI-RS configuration

CSI-RS resource, resource set

Bandwidth part status information

The terminal may measure beams of the serving cell and the neighbor cell on the basis of information received from the serving base station. The terminal may perform the beam measurement process and the RRM measurement process separately or simultaneously.

In operation 940, the serving base station may receive a beam measurement result from the terminal. The beam measurement result may be a beam report or an RRM measurement report. Further, the beam measurement result may include both the beam report and the RRM measurement report. The RRM measurement report may be triggered to the terminal in case that a preset report condition is satisfied. The measurement result may be a measurement result for the CSI-RS. The serving base station may transmit the measurement result received from the terminal to the neighbor base station. The beam measurement result may include a beam ID or a beam group ID, and may further include at least one piece of information such as a beam measurement value corresponding to the beam ID or the beam group ID, a beam measurement average value, and a sample value.

In operation 950, the serving base station may manage mobility of the terminal. The serving base station may manage mobility on the basis of the measurement result received from the terminal. For example, the serving base station may determine handover of the terminal on the basis of the received measurement result.

The operation of the base station is not limited to the operation of FIG. 9 and may include the operation of the base station according to the embodiment of the disclosure described with reference to FIGS. 1 to 8.

Figure 10:
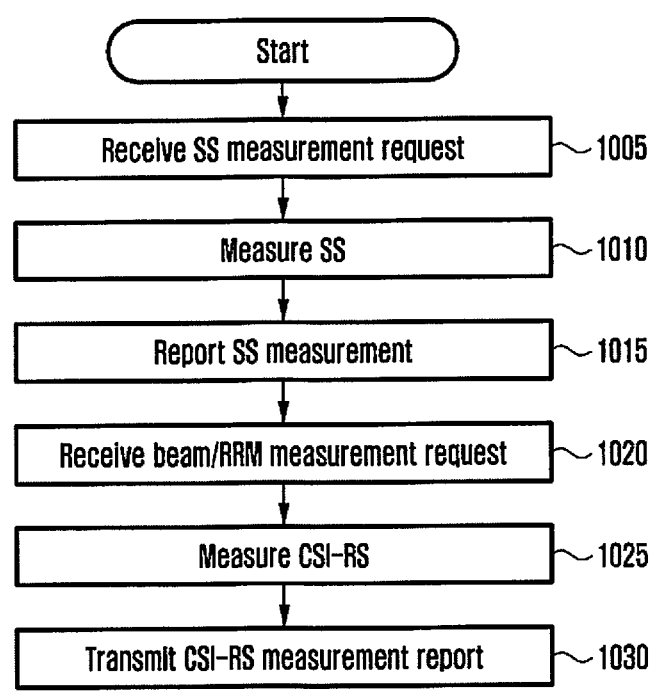
FIG. 10 illustrates the operation of a terminal according to an embodiment of the disclosure.

FIG. 10 illustrates the operation of the terminal according to an embodiment of the disclosure.

Referring to FIG. 10, the terminal may receive an SS measurement request from a serving base station. The SS measurement request may include an SS measurement request for the serving base station and an SS measurement request for the neighbor cell. The SS measurement request for the serving base station may be received in advance, and the terminal may receive the SS measurement request for the neighbor cell from the serving base station. The SS measurement request may include information on an object which is a target of SS measurement, timing, a cell, and a beam. For example, a neighbor cell ID and an SS timing configuration may be included. Candidate beam IDs of a neighbor cell may be included. The SS timing configuration may include at least one of a time offset and periodicity.

In operation 1010, the terminal may perform SS measurement. The terminal may perform SS measurement on the serving cell of the serving base station and perform SS measurement on a neighbor cell. The terminal may perform SS measurement on the basis of information received in operation 1005. The SS measurement by the terminal may correspond to measurement of a signal included in SS block/SS burst/SS burst set/SS block series.

In operation 1015, the terminal may transmit an SS measurement report to the serving base station. The SS measurement report may include an SS measurement result for the serving cell and/or an SS measurement report for the neighbor cell. The SS measurement result may be reported to the base station by the terminal in case that a preset report condition is satisfied. The SS measurement report may include information on a neighbor cell ID, a preferred SS beam, a beam identifier, a beam signal intensity, and a beam signal quality. As described in the embodiment, the serving base station may manage mobility of the terminal on the basis of the SS measurement report.

In operation 1020, the terminal may receive a beam/PRM measurement request from the serving base station. The measurement request may be a CSI-RS measurement request. The measurement request may include CSI-RS resource configuration information and information on a bandwidth to be measured. The measurement request may be a measurement request for a CSI-RS of the serving cell and/or a CSI-RS of the neighbor cell. The terminal has already measured the CSI-RS of the serving cell, and may measure the CSI-RS of the neighbor cell according to a measurement request received from the serving base station. The terminal may measure at least one of a CSI-RS for beam measurement and a CSI-RS for RRM measurement according to a configuration of the serving cell and the neighbor cell. For example, refer to types A, B, and C described above. A process of receiving a request for indicating measurement of the CSI-RS for beam measurement and a process of receiving a request for indicating measurement of the CSI-RS for RRM measurement may be separately performed.

The measurement request may include at least one piece of the following information.

The number of antenna ports for measurement (1 port—port for beam management, RRM measure)

Configurable time/frequency resource to indicate RE mapping within BWP

Numerology information

CRI

Spatial QCL-related indication

Gap pattern ID

CSI-RS configuration

CSI-RS resource, resource set

Bandwidth part status information

In operation 1025, the terminal may perform the beam/RRM measurement operation. The terminal may measure a CSI-RS of the serving cell and/or the neighbor cell on the basis of information received from the serving base station. The terminal may perform the beam measurement operation and the RRM measurement operation separately or simultaneously. In case that the beam measurement operation and the RRM measurement operation are performed separately, the terminal may perform the RRM measurement operation on the basis of the beam measurement result. For example, the terminal may measure the CSI-RS on the basis of a good beam as confirmed by a beam measurement result. In case that a measurement gap is configured, the terminal may perform the measurement operation for the serving cell and the neighbor cell in consideration of the measurement gap. The terminal may measure CSI-RS resources, of which the configuration is received, for each beam. The terminal may measure the CSI-RS for each beam of the serving cell and the CSI-RS for each beam of the neighbor cell.

In operation 1030, the terminal may transmit the beam measurement result to the serving base station. The beam measurement result may be a beam report or an RRM measurement report. Further, the beam measurement result may include both the beam report and the RRM measurement report. The RRM measurement report may be triggered to the terminal in case that a preset report condition is satisfied. The measurement result may be a measurement result for the CSI-RS. The beam measurement result may include a beam ID or a beam group ID, and may further include at least one piece of information such as a beam measurement value corresponding to the beam ID or the beam group ID, a beam measurement average value, and a sample value.

The measurement report which the terminal transmits to the serving base station may be used by the serving base station. For example, the measurement report may be used when the serving base station determines mobility of the terminal. For example, the serving base station may determine a handover of the terminal on the basis of the measurement report.

The operation of the terminal is not limited to the operation of FIG. 10 and may include the operation of the terminal according to the embodiment of the disclosure described with reference to FIGS. 1 to 9.

Figure 11:
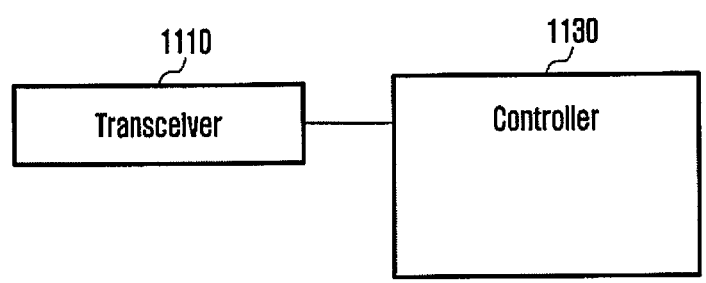
FIG. 11 illustrates a structure of the base station according to an embodiment of the disclosure.

FIG. 11 illustrates the structure of the base station according to an embodiment of the disclosure.

Referring to FIG. 11, the base station may include a transceiver 1110 and a controller 1130. In an embodiment of the disclosure, the controller 1130 may be defined as a circuit, an application-specific integrated circuit, or at least one processor. The transceiver 1110 may transmit/receive a signal to/from another network entity. The transceiver 1110 may transmit, for example, a synchronization signal and a reference signal, transmit a configuration for measuring the synchronization signal and the reference signal, and receive a measurement report from the terminal.

The controller 1130 may control the overall operation of the base station.

According to an embodiment of the disclosure, the controller 1130 may perform control to transmit a synchronization signal (SS) measurement report request to the terminal, receive a first measurement report including SS measurement information for a neighbor base station from the terminal, transmit a channel state information-reference signal (CSI-RS) measurement report request to the terminal on the basis of the first measurement report, and receive a second measurement report including CSI-RS measurement information for the neighbor base station from the terminal. At this time, in case that a bandwidth part which the terminal should measure or a center frequency for the neighbor base station is different from that of the base station, the CSI-RS measurement report request may include information on a measurement gap. A measurement gap configured when the center frequency is different may be larger than a measurement gap configured when the bandwidth part is different.

Further, the controller 1130 may perform control to make a request for changing at least one of a CSI-RS configuration for the terminal, a bandwidth part configuration, and a center frequency configuration to the neighbor base station on the basis of the first measurement report.

The controller 1130 may perform control to determine mobility of the terminal on the basis of at least one of the first measurement report and the second measurement report.

The structure of the base station in FIG. 11 can be applied to both the serving base station and the neighbor base station. Meanwhile, in an embodiment of the disclosure, the operation of the base station and the controller 1130 is not limited to the example of FIG. 11, and the base station may perform the operation of the base station described with reference to FIGS. 1 to 10 and the controller 1130 may control the operation of the base station described with reference to FIGS. 1 to 10.

Figure 12:
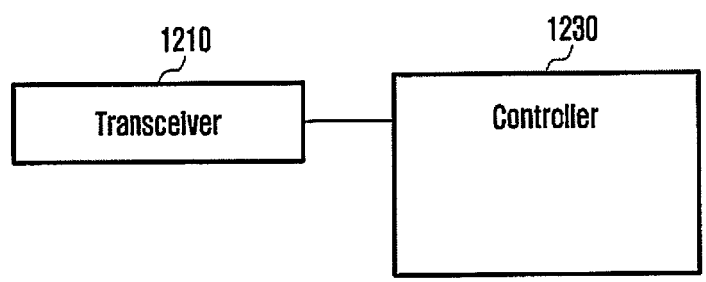
FIG. 12 illustrates a structure of the terminal according to an embodiment of the disclosure.

FIG. 12 illustrates the structure of the terminal according to an embodiment of the disclosure.

Referring to FIG. 12, the terminal may include a transceiver 1210 and a controller 1230.

Referring to FIG. 12, the terminal may include a transceiver 1210 and a controller 1230. In an embodiment of the disclosure, the controller 1230 may be defined as a circuit, an application-specific integrated circuit, or at least one processor. The transceiver 1210 may transmit/receive a signal to/from another network entity. The transceiver 1210 may receive and measure, for example, a synchronization signal and a reference signal, receive a configuration for measuring the synchronization signal and the reference signal, and transmit a measurement result to the base station.

The controller 1230 may control the overall operation of the terminal.

According to an embodiment of the disclosure, the controller 1230 may perform control to receive a synchronization signal (SS) measurement report request from the base station, transmit a first measurement report including SS measurement information for a neighbor base station to the base station, receive a channel state information-reference signal (CSI-RS) measurement report request from the base station in response to the first measurement report, and transmit a second measurement report including CSI-RS measurement information for the neighbor base station to the base station. At this time, in case that a bandwidth part which the terminal should measure or a center frequency for the neighbor base station is different from that of the base station, the CSI-RS measurement report request may include information on a measurement gap. A measurement gap configured when the center frequencies are different may be larger than a measurement gap configured when the bandwidth parts are different. Further, at least one of the first measurement report and the second measurement report may be used to determine mobility of the terminal by the base station.

Meanwhile, the operation of the terminal and the controller 1230 is not limited to the example of FIG. 12, and the terminal may perform the operation of the terminal described with reference to FIGS. 1 to 10 and the controller 1230 may control the operation of the terminal described with reference to FIGS. 1 to 10.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method of operating a base station, the method comprising:
   transmitting, to a terminal, a synchronization signal (SS) measurement report request;
   receiving, from the terminal, a first measurement report including SS measurement information for a neighbor base station;
   transmitting, to the terminal, a channel state information-reference signal (CSI-RS) measurement report request, based on the first measurement report; and
   receiving, from the terminal, a second measurement report including CSI-RS measurement information for the neighbor base station,
   wherein, in case that a bandwidth part or a center frequency to be measured by the terminal for the neighbor base station is different from that of the base station, the CSI-RS measurement report request includes information on a measurement gap, and
   wherein a measurement gap configured for the center frequency being different is larger than a measurement gap configured for the bandwidth part being different.

2. The method of claim 1, further comprising making a request for changing at least one of a CSI-RS configuration, a bandwidth part configuration, or a center frequency configuration for the terminal to the neighbor base station, based on the first measurement report.

3. The method of claim 1, further comprising determining mobility of the terminal, based on at least one of the first measurement report or the second measurement report.

4. A base station comprising:
   a transceiver configured to transmit and receive a signal; and
   a controller configured to:
      transmit, to a terminal, a synchronization signal (SS) measurement report request,
      receive, from the terminal, a first measurement report including SS measurement information for a neighbor base station,
      transmit, to the terminal, a channel state information-reference signal (CSI-RS) measurement report request, based on the first measurement report, and
      receive, from the terminal, a second measurement report including CSI-RS measurement information for the neighbor base station,
   wherein, in case that a bandwidth part or a center frequency to be measured by the terminal for the neighbor base station is different from that of the base station, the CSI-RS measurement report request includes information on a measurement gap, and
   wherein a measurement gap configured for the center frequency being different is larger than a measurement gap configured for the bandwidth part being different.

5. The base station of claim 4, wherein the controller is configured to make a request for changing at least one of a CSI-RS configuration, a bandwidth part configuration, or a center frequency configuration for the terminal to the neighbor base station, based on the first measurement report.

6. The base station of claim 4, wherein the controller is configured to determine mobility of the terminal, based on at least one of the first measurement report or the second measurement report.

7. A method of operating a terminal, the method comprising:
   receiving, from a base station, a synchronization signal (SS) measurement report request;
   transmitting, to the base station, a first measurement report including SS measurement information for a neighbor base station;
   receiving, from the base station, a channel state information-reference signal (CSI-RS) measurement report request in response to the first measurement report; and
   transmitting, to the base station, a second measurement report including CSI-RS measurement information for the neighbor base station,
   wherein, in case that a bandwidth part or a center frequency to be measured by the terminal for the neighbor base station is different from that of the base station, the CSI-RS measurement report request includes information on a measurement gap, and
   wherein a measurement gap configured for the center frequency being different is larger than a measurement gap configured for the bandwidth part being different.

8. The method of claim 7, wherein at least one of the first measurement report or the second measurement report is used to determine mobility of the terminal by the base station.

9. The method of claim 7, wherein the first measurement report is used to determine a handover of the terminal by the base station.

10. A terminal comprising:
    a transceiver configured to transmit and receive a signal; and
    a controller configured to:
       receive, from a base station, a synchronization signal (SS) measurement report request,
       transmit, to the base station, a first measurement report including SS measurement information for a neighbor base station,
       receive, from the base station, a channel state information-reference signal (CSI-RS) measurement report request in response to the first measurement report, and
       transmit, to the base station, a second measurement report including CSI-RS measurement information for the neighbor base station,
    wherein, in case that a bandwidth part or a center frequency to be measured by the terminal for the neighbor base station is different from that of the base station, the CSI-RS measurement report request includes information on a measurement gap, and
    wherein a measurement gap configured for the center frequency being different is larger than a measurement gap configured for the bandwidth part being different.

11. The terminal of claim 10, wherein at least one of the first measurement report or the second measurement report is used to determine mobility of the terminal by the base station, and the first measurement report is used to determine handover of the terminal by the base station.

* * * * *